(12) United States Patent
Hopf

(10) Patent No.: US 12,440,972 B2
(45) Date of Patent: Oct. 14, 2025

(54) METHOD FOR PROVIDING INFORMATION FOR A ROBOT DEVICE AND AN ELECTRONIC COMPUTING DEVICE

(71) Applicant: Bayerische Motoren Werke Aktiengesellschaft, Munich (DE)

(72) Inventor: Timo Hopf, Langweid (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 64 days.

(21) Appl. No.: 18/682,043

(22) PCT Filed: Aug. 25, 2022

(86) PCT No.: PCT/EP2022/073682
§ 371 (c)(1),
(2) Date: Feb. 7, 2024

(87) PCT Pub. No.: WO2023/041302
PCT Pub. Date: Mar. 23, 2023

(65) Prior Publication Data
US 2025/0121494 A1    Apr. 17, 2025

(30) Foreign Application Priority Data
Sep. 17, 2021  (DE) .................. 10 2021 124 053.0

(51) Int. Cl.
*B25J 9/16*    (2006.01)

(52) U.S. Cl.
CPC ............. *B25J 9/163* (2013.01); *B25J 9/1671* (2013.01); *B25J 9/1684* (2013.01)

(58) Field of Classification Search
CPC ........ B25J 9/163; B25J 9/1671; B25J 9/1684; G05B 2219/45065; G05B 2219/39159
See application file for complete search history.

(56) References Cited

U.S. PATENT DOCUMENTS 3,567,899 A * 3/1971 Iceland ................ B23K 9/0956
219/124.34
3,855,446 A * 12/1974 Kotova ................ B23Q 35/128
219/124.34
(Continued)

FOREIGN PATENT DOCUMENTS

DE    10 2004 001 769 B3    8/2005
DE    10 2006 005 344 A1    8/2007
(Continued)

OTHER PUBLICATIONS

Wagner, T., "Integrated robotic gluing system", Proceedings for the Joint Conference of ISR 2010 (41st International Symposium on Robotics) and Robotik 2010 (6th German Conference on Robotics), Jun. 7 2010, pp. 835-837, XP093004050 (3 pages).
(Continued)

*Primary Examiner* — Bhavesh V Amin
(74) *Attorney, Agent, or Firm* — Crowell & Moring LLP

(57) ABSTRACT

A method for providing information for a robot device designed to provide a seam on a motor vehicle component, the method including creating a construction space model for a motor vehicle comprising the motor vehicle component, recording respective seams to be provided on the motor vehicle in the construction space model, creating a seam primary key for each seam and storing them in the construction space model, wherein the seam primary key characterizes at least one property of the associated seam, and controlling the robot device depending on the construction space model with the respective seam primary keys of the seams.

18 Claims, 1 Drawing Sheet

(56) References Cited

U.S. PATENT DOCUMENTS

| | | | | |
|---|---|---|---|---|
| 4,380,696 | A * | 4/1983 | Masaki | G05B 19/42 |
| | | | | 318/568.14 |
| 4,532,404 | A * | 7/1985 | Boillot | B23K 9/124 |
| | | | | 219/130.21 |
| 4,567,348 | A * | 1/1986 | Smith | B23K 9/1274 |
| | | | | 901/42 |
| 4,568,816 | A * | 2/1986 | Casler, Jr. | G05B 19/4083 |
| | | | | 901/42 |
| 4,613,743 | A * | 9/1986 | Nied | B23K 9/0956 |
| | | | | 219/130.21 |
| 4,650,959 | A * | 3/1987 | Swensrud | B23K 9/1336 |
| | | | | 901/42 |
| 4,675,502 | A * | 6/1987 | Haefner | B25J 9/1684 |
| | | | | 901/3 |
| 5,171,966 | A * | 12/1992 | Fukuoka | G05B 19/425 |
| | | | | 219/124.34 |
| 5,475,198 | A * | 12/1995 | Burke | B23K 9/1274 |
| | | | | 219/136 |
| 7,946,439 | B1 * | 5/2011 | Toscano | B65D 90/503 |
| | | | | 220/62.17 |
| 9,064,920 | B2 * | 6/2015 | Schaller | H01L 21/67706 |
| 9,180,552 | B2 * | 11/2015 | Bhattad | B23K 31/125 |
| 9,604,305 | B2 * | 3/2017 | Spicer | B23K 31/125 |
| 10,460,479 | B2 * | 10/2019 | Lee | H04N 21/44008 |
| 10,518,409 | B2 * | 12/2019 | Oleynik | G05B 19/42 |
| 10,814,440 | B1 * | 10/2020 | Spillane | B25J 18/02 |
| 10,960,483 | B2 * | 3/2021 | Ge | B23K 9/32 |
| 11,123,863 | B2 * | 9/2021 | Kishi | B25J 13/06 |
| 11,135,720 | B2 * | 10/2021 | Hazan | G05B 19/4155 |
| 11,348,322 | B1 * | 5/2022 | Treskunov | G06T 15/205 |
| 11,548,162 | B2 * | 1/2023 | Lonsberry | G06V 10/82 |
| 11,648,683 | B2 * | 5/2023 | Lonsberry | G05B 19/4207 |
| | | | | 219/124.34 |
| 11,759,952 | B2 * | 9/2023 | Lonsberry | G06V 20/20 |
| | | | | 228/8 |
| 11,759,958 | B2 * | 9/2023 | Lonsberry | B25J 9/1664 |
| | | | | 219/124.34 |
| 11,801,606 | B2 * | 10/2023 | Lonsberry | B25J 9/1664 |
| 11,859,964 | B2 * | 1/2024 | Lonsberry | G01B 11/2513 |
| 11,878,408 | B2 * | 1/2024 | Jeromin | B25J 19/02 |
| 12,005,585 | B2 * | 6/2024 | Schönherr | B25J 9/1666 |
| 12,070,867 | B2 * | 8/2024 | Lonsberry | B23K 37/0229 |
| 12,109,709 | B2 * | 10/2024 | Lonsberry | B23K 9/32 |
| 2004/0257021 | A1 * | 12/2004 | Chang | G05B 19/427 |
| | | | | 318/568.21 |
| 2007/0199929 | A1 | 8/2007 | Rippl et al. | |
| 2011/0172818 | A1 * | 7/2011 | Kim | B25J 9/1666 |
| | | | | 901/2 |
| 2013/0119040 | A1 * | 5/2013 | Suraba | B23K 9/0953 |
| | | | | 219/136 |
| 2014/0023461 | A1 * | 1/2014 | Schaller | H01L 21/67781 |
| | | | | 901/30 |
| 2014/0277722 | A1 * | 9/2014 | Nagai | B25J 9/1692 |
| | | | | 700/254 |
| 2014/0309774 | A1 * | 10/2014 | Chen | G05B 19/41865 |
| | | | | 700/248 |
| 2014/0348415 | A1 * | 11/2014 | Bhattad | B23K 31/125 |
| | | | | 382/152 |
| 2016/0059412 | A1 * | 3/2016 | Oleynik | G05B 19/42 |
| | | | | 700/250 |
| 2018/0117701 | A1 * | 5/2018 | Ge | B23K 9/1272 |
| 2019/0224842 | A1 * | 7/2019 | Kishi | B25J 13/06 |
| 2019/0358816 | A1 | 11/2019 | Saito et al. | |
| 2020/0030971 | A1 * | 1/2020 | Oleynik | B25J 9/163 |
| 2020/0108497 | A1 * | 4/2020 | Miyazaki | B25J 19/0033 |
| 2020/0122327 | A1 * | 4/2020 | Hazan | B25J 13/06 |
| 2021/0069910 | A1 * | 3/2021 | Oleynik | F25D 23/028 |
| 2021/0197378 | A1 * | 7/2021 | Schönherr | B25J 9/1666 |
| 2021/0334742 | A1 * | 10/2021 | Nazarian | G05D 1/0246 |
| 2021/0387350 | A1 * | 12/2021 | Oleynik | A47J 44/00 |
| 2022/0080588 | A1 * | 3/2022 | High | G05D 1/692 |
| 2022/0118618 | A1 * | 4/2022 | Oleynik | B25J 13/089 |
| 2022/0305648 | A1 * | 9/2022 | Oleynik | B25J 9/163 |
| 2023/0111284 | A1 * | 4/2023 | Gildert | B25J 9/1661 |
| | | | | 700/250 |
| 2023/0347511 | A1 * | 11/2023 | High | G05D 1/692 |
| 2024/0066713 | A1 * | 2/2024 | Shoji | B25J 9/1682 |
| 2025/0048958 | A1 * | 2/2025 | Lorrez | A01D 34/008 |
| 2025/0121494 | A1 * | 4/2025 | Hopf | B25J 9/1671 |

FOREIGN PATENT DOCUMENTS

| | | |
|---|---|---|
| DE | 10 2007 062 535 A1 | 6/2009 |
| DE | 10 2008 027 475 A1 | 12/2009 |
| DE | 10 2005 051 533 B4 | 10/2015 |
| DE | 10 2014 014 361 A1 | 3/2016 |
| DE | 10 2018 114 867 A1 | 12/2019 |
| DE | 11 2018 000 765 T5 | 12/2019 |
| DE | 10 2019 107 417 A1 | 9/2020 |
| KR | 10-2020-0127751 A | 11/2020 |
| WO | WO 2018/099980 A1 | 6/2018 |

OTHER PUBLICATIONS

International Search Report (PCT/ISA/210) issued in PCT Application No. PCT/EP2022/073682 dated Dec. 9, 2022 with English translation (4 pages).

German-language Written Opinion (PCT/ISA/237) issued in PCT Application No. PCT/EP2022/073682 dated Dec. 9, 2022 with English translation (12 pages).

German-language Search Report issued in German Application No. 10 2021 124 053.0 dated May 31, 2022 with partial English translation (9 pages).

* cited by examiner

METHOD FOR PROVIDING INFORMATION FOR A ROBOT DEVICE AND AN ELECTRONIC COMPUTING DEVICE

BACKGROUND AND SUMMARY

The invention relates to a method for providing information for a robot device and to an electronic computing device.

WO 2018/099980 A1 discloses a nozzle device for dispensing a viscous application medium in the form of at least one jet onto a component. The viscous application medium is in particular polyvinyl chloride. The nozzle device may in particular be guided by a robot.

When processing components, the problem may arise that robot programs have to be manually programmed for respective robot devices or existing robot programs have to be manually adapted to respective robot devices. This may involve a great amount of work.

An object of the present invention is therefore to provide a solution which makes possible particularly easy programming of a robot device for providing a seam on a motor vehicle component.

This object is achieved according to the invention by the subject matter as disclosed herein. Further possible refinements of the invention are also disclosed in the description and the figures.

The invention relates to a method for providing information for a robot device, the robot device in turn being designed to provide a seam on a motor vehicle component. By way of this seam, the motor vehicle component can for example be connected to a further component and/or be sealed off with respect to the further component.

For example, it would be conceivable to carry out robot programming in the paint shop environment manually on the basis of prescribed defaults in the form of a PDF document for the respective application, in particular on the basis of PVC construction space models or painting surface catalogs.

Instead, in the method it is provided that a construction space model is created for a motor vehicle comprising the motor vehicle component. The construction space model is in particular a three-dimensional model which represents the motor vehicle component in interaction with further components of a motor vehicle comprising the motor vehicle component, in particular the entire motor vehicle. In particular, the construction space model replicates how respective motor vehicle components of the motor vehicle are arranged in relation to one another.

In the method it is also provided that respective seams to be provided on the motor vehicle are recorded in the construction space model. In other words, the seams to be provided on the motor vehicle component are stored in the construction space model. In the method it is also provided that a seam primary key is created for each seam and is stored in the construction space model, the seam primary key characterizing at least one property of the assigned seam. The seam primary key is in particular an identification, which may be formed for example by numbers and/or letters. This identification characterizes the at least one property of the seam. By way of this seam primary key, the respective seam assigned to the seam primary key can consequently be uniquely identified and characterized. In the method it is also provided that the robot device is controlled in dependence on the construction space model with the respective seam primary keys of the seams. The robot device can consequently be controlled in dependence on the three-dimensional model of the motor vehicle component or the motor vehicle, the respective seams that are to be provided on the motor vehicle component being uniquely identified and prescribed by the assigned seam primary keys. The construction space model, in which the seam primary keys of the respective seams are stored, makes it possible that different robot devices can be controlled particularly precisely on the basis of the construction space model, whereby respective seams can be reproducibly provided on respective motor vehicle components.

In a further refinement of the invention it is provided that a robot program for the at least one robot device is created in an automated manner on the basis of the construction space model with the respective seam primary keys of the seams. Here, the robot device is designed to be controlled on the basis of the robot program. On the one hand, easy automatic creation of the robot program is made possible in the first place by the three-dimensional construction space model in which the seam primary keys are stored. On the other hand, the automated creation of the robot program allows this robot program to be provided particularly quickly for respective robot devices. The respective robot devices can consequently be controlled with particularly little effort on the basis of the construction space model by way of the robot program created in an automated manner. Consequently, there is advantageously no need for manual creation of the robot program.

In this connection, it may be provided in particular that the robot program is created in an automated manner for a reference robot device and is adapted to the robot device by way of a transfer table. The transfer table describes a relationship between the reference robot device and the robot device. The reference robot device can consequently be used as a blueprint for respective different robot devices in the creation of the robot program, in particular in the automated creation of the robot program. By way of the respective relationships, stored in the transfer table, between the reference robot device and the respective robot devices for which the robot program created in an automated manner is to be adapted, the robot program can be adapted particularly easily and quickly to the respective robot device in which the robot program is to be used. This allows the robot program to be used particularly universally for a wide variety of robot devices, in that, by way of the transfer table, the robot program is adapted to the respective robot device that is to be controlled in a way corresponding to the robot program.

In a further refinement of the invention it is provided that, for providing the respective seam, the robot program prescribes respective positions for an end effector of the robot device. The end effector is a so-called Tool Center Point of the robot device. By way of the robot program, consequently the respective robot device can be controlled particularly precisely by way of respective positions of the end effector. This makes it possible for respective seams to be provided particularly precisely on the motor vehicle component. In addition, the controlling of the respective robot device on the basis of the robot program by way of the prescribed positions of the end effector makes it possible that at least substantially the same seams can be provided on respective motor vehicle components by a number of different robot devices, and consequently the provision of the seams is reproducible.

In a further possible refinement of the invention it is provided that a movement of the robot device prescribed by the robot program is validated by a simulation of the movement of the robot device and the robot program is adapted in dependence on a result of the simulation. This means that the robot program is checked by the at least one simulation before the robot device is controlled on the basis of the robot program. Depending on the result of the check, the robot program is adapted or remains unchanged and is made available for controlling the robot device. Checking the robot program on the basis of the simulation makes it possible that a collision of the robot device with an element in an area around the robot device, for example with the motor vehicle component, can be avoided. This allows a risk of the robot device being damaged when the robot device is being controlled on the basis of the robot program to be kept particularly low.

In a further possible refinement of the invention it is provided that the respective seam primary key prescribes an application type of the respective seam and/or an application direction of the respective seam and/or an alignment of the end effector of the robot device to be performed in relation to the motor vehicle component and/or a traveling speed of the robot device without application and/or an application parameter of the robot device and/or an end parameter for the respective seam and/or requirements to be maintained for the respective seam. As the application type of the respective seam, the seam primary key may prescribe that a flat seam or a round seam or a fine seam or a surface-area application of the seam is to be performed. As the application direction of the respective seam, it may for example be prescribed that the seam is to be provided on the motor vehicle component in the direction of construction or counter to the direction of construction. Here, the direction of construction may be prescribed separately for each seam. As the alignment of the end effector of the robot device to be performed in relation to the motor vehicle component, an application distance of the end effector from the motor vehicle component and/or an angle to be produced and/or a speed to be adopted by the end effector in relation to the motor vehicle component may be prescribed for during the application of the seam. The traveling speed of the robot device without application describes how long the robot device needs to be moved from a first seam that is to be provided on the motor vehicle component to a second seam that is to be provided on the motor vehicle component. By way of this traveling speed of the robot device, a service life of the robot device is prescribed. As the application parameter of the robot device, for example a preliminary pressure of a medium to be provided for the seam on the motor vehicle component and/or an advancement of the robot device in relation to the motor vehicle component and/or an end of the respective seam may be prescribed. As the end parameter for the respective seam, a seam quality of the seam, in particular at its beginning and/or at its end, may be prescribed, whereby for example a gentle or abrupt runout of the respective seam at the beginning or the end may be defined. For prescribing the end parameter of the respective seam, consequently a lead parameter and/or a lag parameter of the respective seam may be prescribed. As requirements to be maintained for the respective seam, shadowings or prescribed overhangings of respective seams in relation to one another or an allowed or possible grinding over or ripping out may be prescribed for the respective seams. For example, a sequence of seams to be provided on the motor vehicle component may be prescribed by way of the requirements to be maintained. In particular, certain seam crossings may be prescribed as permissible. These prescribed defaults that have been described may be coded in a fixed sequence in the form of the seam primary key. By way of the seam primary key, respective properties of the seam to be provided on the motor vehicle component can consequently be prescribed particularly precisely, whereby the seam is described particularly extensively by the assigned seam primary key. As a result, particularly good reproducibility of the seam provided on the motor vehicle component is made possible on the basis of the seam primary key.

In a further refinement of the invention it is provided that the construction space model is a three-dimensional construction space model. The design of the three-dimensional construction space model allows collisions of respective components of the motor vehicle to be determined particularly easily. Furthermore, progressions of respective seams to be provided on motor vehicle components of the motor vehicle can be stored particularly precisely in a three-dimensional construction space and can be identified particularly easily in the three-dimensional construction space. The three-dimensional construction space model consequently makes it possible for the motor vehicle to be represented particularly easily.

In a further possible refinement of the invention it may be provided that a polyvinyl chloride seam and/or a wax seam and/or a weld seam and/or a paint seam are provided as the seam on the motor vehicle component. In other words, the motor vehicle component may be provided with the weld seam as a seam in order to connect the motor vehicle component for example to a further component of the motor vehicle in a material-bonded manner. As an alternative or in addition, polyvinyl chloride and/or wax and/or paint may be applied to the motor vehicle component for providing the seam.

In a further possible refinement of the invention it is provided that a sequence for respective seams to be provided is stored in the construction space model. It can in this way be ensured that respective seams of the motor vehicle component only have permissible seam crossings. This allows a particularly high stability of the motor vehicle component and a particularly long lifetime of respective seams provided on the motor vehicle component to be ensured.

The invention relates furthermore to an electronic computing device, which is designed to create a robot program for the at least one robot device in an automated manner on the basis of a construction space model with the respective seam primary keys of the seams that is created in the method according to the invention or in one of its possible embodiments. This means that the electronic computing device receives the construction space model with the respective seam primary keys of the seams and automatically creates the robot program for the at least one robot device in dependence on the construction space model and provides it for this robot device. The electronic computing device makes possible particularly easy and quick creation of the robot program on the basis of which the at least one robot device can be controlled from the construction space model with the respective seam primary keys. Advantages and advantageous developments of the method according to the invention should be regarded as advantages and advantageous developments of the electronic computing device, and vice versa.

Further features of the invention may emerge from the claims, the figures and the description of the figures. The features and combinations of features mentioned above in the description and the features and combinations of features shown in the description of the figures below and/or in the figures alone can be used not only in the respectively stated

DETAILED DESCRIPTION OF THE DRAWINGS

Figure 1:
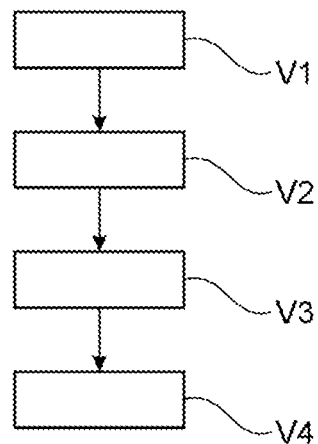
FIG. 1 shows a method scheme for a method for providing information for a robot device.

In FIG. 1, a method scheme for a method for providing information for a robot device is shown. The robot device is designed to provide a seam on a motor vehicle component. In particular, a polyvinyl chloride seam can be applied to the motor vehicle component by the robot device. By the polyvinyl chloride seam, the motor vehicle component can be sealed off with respect to a further component of the motor vehicle. In the course of the method for providing information for the robot device, a robot program may be created, on the basis of which the robot device for providing the seam on the motor vehicle component is controlled.

In the method it is provided that, in a first method step V1, a construction space model, in particular a three-dimensional construction space model, for a motor vehicle comprising the motor vehicle component is created. In a second method step V2, it is provided that respective seams to be provided on the motor vehicle are recorded in the construction space model. In a third method step V3 of the method, it is provided that a seam primary key is created for each seam and is stored in the construction space model. The seam primary key is a unique identification of the respective assigned seam, the seam primary key characterizing at least one property of the assigned seam. The respective seam primary key may prescribe an application type of the respective seam and/or an application direction of the respective seam and/or an alignment of the end effector of the robot device to be performed in relation to the motor vehicle component when applying the seam and/or a traveling speed of the robot device without application and/or an application parameter of the robot device and/or an end parameter for the respective seam and/or requirements to be maintained for the respective seam. Furthermore, a sequence for respective seams to be provided on the motor vehicle component may be stored in the construction space model. This sequence may consequently prescribe in which sequence a number of seams are to be provided on the motor vehicle component.

In a method step V4 of the method, it is provided that the robot device is controlled in dependence on the construction space model with the respective seam primary keys of the seams. For this, the robot program for the at least one robot device may be created in an automated manner by an electronic computing device on the basis of the construction space model with the respective seam primary keys of the seams. This robot program may in particular be created in an automated manner for a reference robot device and be adapted to the robot device by way of a transfer table. Stored in this transfer table in particular is a conversion relationship between the reference robot device and the robot device for which the robot program is to be provided.

For particularly precise and at the same time reproducible control of the robot device on the basis of the robot program, respective positions for an end effector of the robot device may be prescribed by the robot program for providing the respective seam. This end effector is the so-called Tool Center Point of the robot device. In order to avoid a collision of the robot device with the motor vehicle component or further components of the motor vehicle when providing the seam on the motor vehicle component, it may be provided that a movement of the robot device prescribed by the robot program is validated by a simulation of the movement of the robot device. In dependence on a result of the simulation, the robot program is adapted or left unchanged.

Figure 2:
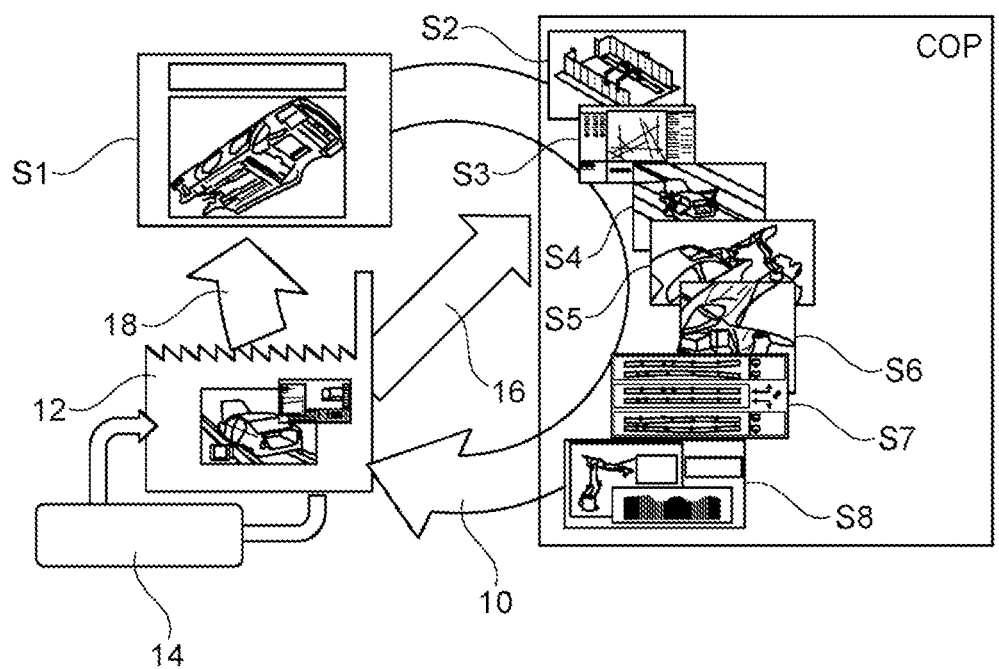
FIG. 2 shows a method sequence for processing a motor vehicle component by the robot device in dependence on the information provided.

In FIG. 2, a method sequence for consistent offline programming (COP) is shown. In this method sequence, in a first step S1, the construction space model is created with the respective seams to be provided on the motor vehicle. Subsequently, the consistent offline programming takes place as a second step S2, in which three-dimensional cell data from the construction space model are centrally stored and updated on a COP server. In a third step S3, the automated initial programming or an optimization of the robot program takes place. In a fourth step S4, a virtual validation with respect to a cycle time to be maintained takes place, whereby particularly efficient robot utilization can be achieved. In a fifth step S5, an accessibility investigation takes place. The virtual validation and the accessibility investigation may be carried out in the course of the simulation. In a sixth step S6, offline programming of new scopes or for a new motor vehicle, and consequently an adaptation of the robot program, may be performed. In a seventh step S7, the robot program may be automatically adapted to a measured real cell, in particular by mirroring. In an eighth step S8, an evaluation of live data of a production works for the motor vehicle component or for the motor vehicle may take place. Daily up-to-date data from a number of works may be used for this. Cost-efficient start-ups of respective new works are made possible and particularly great transparency of robot utilization is created as a result. From the COP, a data transfer 10 takes place to production 14. The robot program may be optimized at a works 12, and consequently in production, by way of the consistent offline programming on a line while production is in progress. A return transfer 16 of the data from production into the COP may be performed. A return 18 of the robot program to planning may take place from the works 12.

The described method for providing information for the robot device makes it possible that the defaults prescribed by the construction space model can be used in digital form with information about a three-dimensionality of the motor vehicle or the vehicle component by way of special data formats directly by artificial intelligence for automatic robot programming. These robot programs can subsequently be transferred to production and also be returned from production to planning. This approach is referred to as consistent offline programming of robot applications. The method makes it possible that time expenditure and cost expenditure can be reduced and a process for offline programming can be simplified. The method makes it possible to use 3D information for application defaults as a basis for automated robot programming. Furthermore, automated robot programming on the basis of heuristic algorithms can be used for paint shop applications.

Automated robot programming on the basis of construction space models for various robot applications such as welding, PVC application, wax application or painting is made possible by the method. Here, an application result can be virtually described as the construction space model, in particular in the construction space model, and provided with a unique numbering, in the present case the seam primary key, which contains information on the application type, and on the basis of which robot paths can be generated in an automated manner. For this, a seam centerline may be generated from a three-dimensional geometry of the construction space model. The robot paths may in turn be optimally allocated to the available robot devices with the aid of algorithms, such that the task, in particular providing the at least one seam, can be carried out with minimal time expenditure.

By entering the unique seam identification in the form of the seam primary key, essential information for the application to the vehicle body can be compiled and used as a basis for the automated robot programming. Challenges of collision-free robot path planning and intelligent division of application scopes among robot devices available in production can be created for the automated robot programming by way of a framework for the application of algorithms, the framework being able to include 3D data for the vehicle body, robot device, housing, conveying technology et cetera. Here, a calculation may comprise creating a movement graph including smoothing of a robot movement and creating a distance matrix with automated division of application scopes on the basis of in particular heuristic methods such as genetic algorithms. The distance matrix may in particular describe in which sequence respective seams are to be applied to the motor vehicle component.

For automated robot programming, the respective seam primary key includes in particular specification of an application type, an application direction, prescribed defaults for the end effector of the robot device, a traveling speed of the robot device without application, application parameters, lead/lag parameters and also requirements to be maintained with respect to shadowing, overhanging, grinding over and ripping out. These prescribed defaults may be coded in a specified sequence in the form of the seam primary key.

Following the automated creation of robot programs, they may be transferred into a real installation on the basis of transfer tables. For this, the installation may be measured in advance, whereby a deviation between the ideal robot programming, in particular the robot program for the reference robot device, and the real robot device is determined. This allows respective positions of the end effector of the created robot program to be converted from the virtual world into the real world. These transfer tables may contain vector information for an entire working space of the robot device on the basis of measurement data. Subsequently, the at least one robot program may also be returned from production to production planning again.

This consistent offline programming may be used in every offline programming of new robot programs up until the robot programs are put into operation in production. It is also possible for this to be extended to applications in body making and assembly.

Altogether, the invention shows how consistent automated offline robot programming from product planning through to production can be made possible on the basis of a virtual construction space model.

LIST OF REFERENCE SIGNS

10 Data transfer
12 Works
14 Optimization
16 Return transfer
18 Return
V1 to V4 Respective method steps
S1 to S8 Respective steps of a process

What is claimed is:

1. A method for providing information for a robot device configured to provide a seam on a motor vehicle component, the method comprising:
   creating a construction space model for a motor vehicle comprising the motor vehicle component;
   recording respective seams to be provided on the motor vehicle in the construction space model;
   creating a seam primary key for each seam and storing the seam primary key for each seam in the construction space model, wherein the seam primary key characterizes at least one property of the corresponding seam; and
   controlling the robot device in dependence on the construction space model with the respective seam primary keys of the respective seams.

2. The method according to claim 1, comprising:
   creating a robot program for the robot device in an automated manner on a basis of the construction space model with the seam primary keys of the respective seams, wherein the robot device is configured to be controlled on a basis of the robot program.

3. The method according to claim 2, comprising:
   creating the robot program in an automated manner for a reference robot device; and
   adapting the robot program to the robot device by way of a transfer table, the transfer table describing a relationship between the reference robot device and the robot device.

4. The method according to claim 2,
   wherein the robot program prescribes respective positions for an end effector of the robot device for providing the respective seam.

5. The method according to claim 2, comprising:
   validating a movement of the robot device prescribed by the robot program by a simulation of the movement of the robot device; and
   adapting the robot program in dependence on a result of the simulation.

6. The method according to claim 1,
   wherein the respective seam primary key prescribes an application type of the respective seam and/or an application direction of the respective seam and/or an alignment of an end effector of the robot device to be performed in relation to the motor vehicle component and/or a traveling speed of the robot device without application and/or an application parameter of the robot device and/or an end parameter for the respective seam and/or requirements to be maintained for the respective seam.

7. The method according to claim 1, wherein the construction space model is a three-dimensional model.

8. The method according to claim 1,
   wherein a polyvinyl chloride seam and/or a wax seam and/or a weld seam and/or a paint seam is provided as the seam on the motor vehicle component.

9. The method according to claim 1,
   wherein a sequence for respective seams to be provided is stored in the construction space model.

10. An electronic computing device, configured to:
    create a construction space model for a motor vehicle comprising a motor vehicle component;
    record respective seams to be provided on the motor vehicle by a robot device in the construction space model;
    create a seam primary key for each seam and store the seam primary key for each seam in the construction space model, wherein the seam primary key characterizes at least one property of the corresponding seam; and control the robot device in dependence on the construction space model with the respective seam primary keys of the respective seams.

11. The electronic computing device according to claim 10, configured to:

create a robot program for the robot device in an automated manner on a basis of the construction space model with the respective seam primary keys of the seams.

12. The electronic computing device according to claim 11, configured to:

create the robot program in an automated manner for a reference robot device; and adapt the robot program to the robot device by way of a transfer table, the transfer table describing a relationship between the reference robot device and the robot device.

13. The electronic computing device according to claim 11, wherein the robot program prescribes respective positions for an end effector of the robot device for providing the respective seam.

14. The electronic computing device according to claim 11, configured to:

validate a movement of the robot device prescribed by the robot program by a simulation of the movement of the robot device; and adapt the robot program in dependence on a result of the simulation.

15. The electronic computing device according to claim 10, wherein the respective seam primary key prescribes an application type of the respective seam and/or an application direction of the respective seam and/or an alignment of an end effector of the robot device to be performed in relation to the motor vehicle component and/or a traveling speed of the robot device without application and/or an application parameter of the robot device and/or an end parameter for the respective seam and/or requirements to be maintained for the respective seam.

16. The electronic computing device according to claim 10, wherein the construction space model is a three-dimensional model.

17. The electronic computing device according to claim 10, wherein a polyvinyl chloride seam and/or a wax seam and/or a weld seam and/or a paint seam is provided as the seam on the motor vehicle component.

18. The electronic computing device according to claim 10, wherein a sequence for respective seams to be provided is stored in the construction space model.

* * * * *